UNITED STATES PATENT OFFICE.

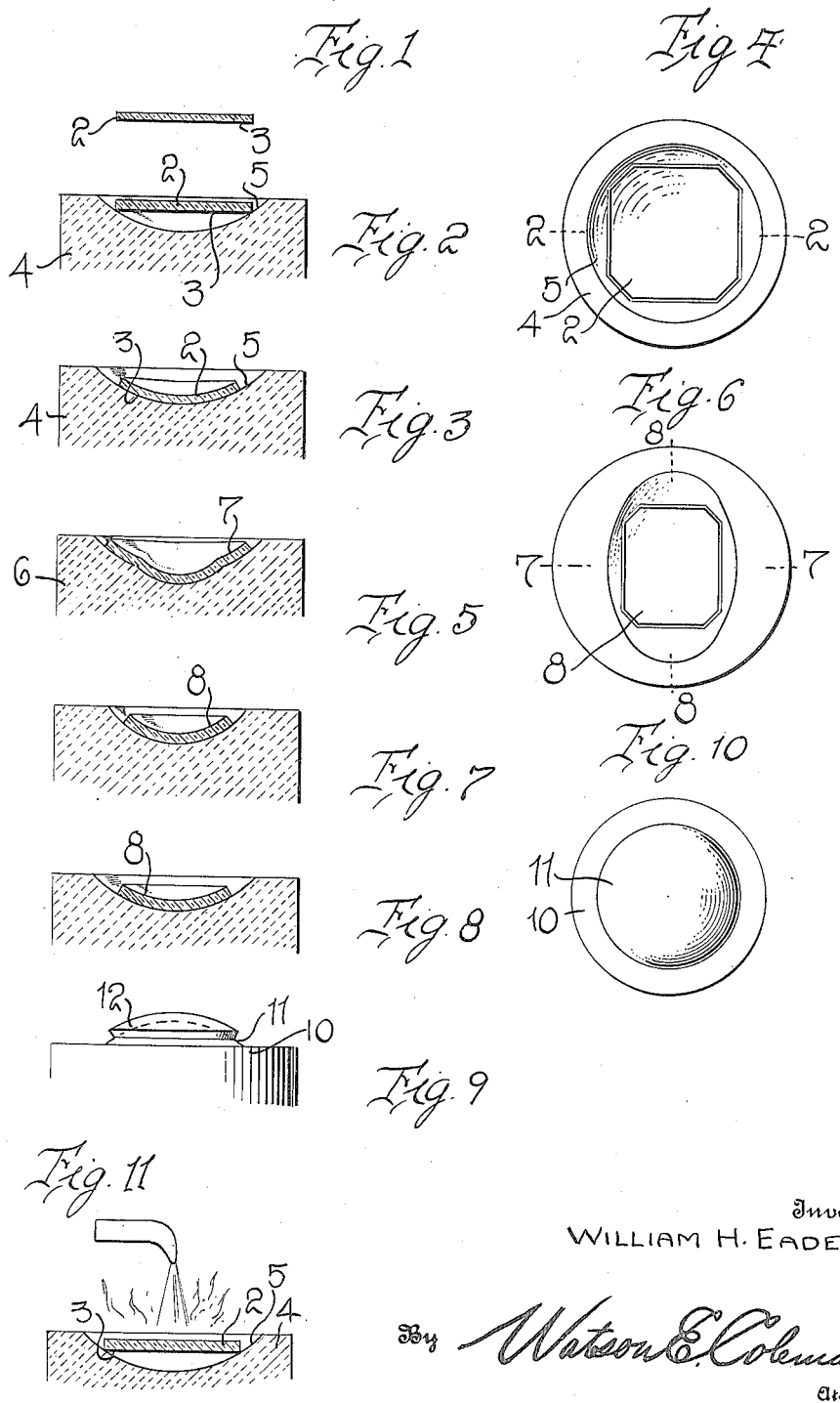

WILLIAM H. EADER, OF DENVER, COLORADO.

METHOD OF FORMING LENSES.

1,180,383.   Specification of Letters Patent.   Patented Apr. 25, 1916.

Application filed September 4, 1915. Serial No. 49,067.

*To all whom it may concern:*

Be it known that I, WILLIAM H. EADER, a citizen of the United States, residing at Denver, in the county of Denver and State of Colorado, have invented certain new and useful Improvements in Methods of Forming Lenses, of which the following is a specification, reference being had to the accompanying drawings.

This invention relates to the formation of lenses, and the primary object of the invention is to provide a method whereby lenses of any desired conformation or character may be readily, cheaply and expeditiously made without the necessity of grinding or polishing both faces of the lenses.

A further object is to provide a method of making lenses whereby a blank of plain flat glass having at least one polished surface may be easily and cheaply formed into a lens with one surface correctly shaped and polished, the other surface having nearly an approximation to a finished form and being adapted to be afterward ground and polished to the desired curvature.

Still another object is to provide a method whereby a blank of polished glass may be caused by heat to conform to a definite mold surface whereby to produce one entirely finished face of a lens of any desired shape in one operation, the other face of the lens being afterward ground and polished to any desired curvature or contour.

A further object of the invention is to provide a process whereby a blank of glass polished on one face may be formed into a lens by molding under the action of heat to produce one face of a finished lens of any desired shape in one operation so that the one side or face of the lens retains the original polish of the glass blank and requires no further finishing, the lens being entirely finished by grinding and polishing the other face in the usual way to produce any desired curvature.

My method is applicable to the provision of lenses of any desired curvature and of one or more curves, such as focal, or mono-focal, bi-focal or tri-focal lenses, etc., the lens or any part thereof being suited to any desired focal strength or distance or dioptrical conformation, or composed of any combination of curves, such as the combination of the spherical and cylindrical curves used in toric lenses, or any other desired combination of curved surfaces.

My invention is illustrated in the accompanying drawings, wherein,

Figure 1 is a sectional view of a glass blank from which a lens is to be made; Fig. 2 is a sectional view on the line 2—2 of Fig. 4; Fig. 3 is a like view to Fig. 2, but showing the lens after the heat has been applied thereto to cause its subsidence; Fig. 4 is a plan view of the mold as illustrated in Fig. 3, showing the lens blank therein; Fig. 5 is a cross sectional view of a mold whose molding face is formed with two curvatures, the figure also showing a lens blank conforming to the facial curvature of the mold after the action of the heat thereon; Fig. 6 shows a plan view of a mold used for the production of toric lenses; Figs. 7 and 8 are sections on the lines 7—7 and 8—8 respectively of Fig. 6; Fig. 9 is a side elevation of a mold used for forming a concave side of a lens, the lens blank being shown thereon after it has been subjected to heat; Fig. 10 is a plan view of the mold and lens blank shown in Fig. 9; and Fig. 11 is a section showing the application of heat to the glass blank.

Referring to these figures, and particularly to Figs. 1, 2, 3 and 4, 2 designates a lens blank composed of a piece of flat glass having plano-parallel surfaces, this glass having the usual polish on one or both faces, it being understood that the face of the glass which is to confront the mold is to be polished under all circumstances. This polished face of the glass is designated 3. The lens blank may be of any desired shape, size or thickness for the production of the lens desired.

In Fig. 4 the lens blank is shown as approximately square in plan, with cut away corners. This is merely illustrative, however, and the blank, as before stated, may have any desired or necessary form.

The mold 4, illustrated in Fig. 2 may be constructed of any suitable material, but has its upper surface formed with a mold face 5, which face has exactly the curvature, concavity or contour desired, this mold face on the surface being absolutely smooth in finish and optically true to the lens which is to be produced therefrom.

In the particular instance shown in Figs. 2, 3 and 4, the mold face or surface has the form of a single spherical curve. This mold surface may be cut, ground or otherwise produced upon the body of the mold, or the body of the mold may itself be molded to produce the mold surface, or otherwise acted upon by means of a die or template and should be ground, polished or otherwise formed so that it will have an absolutely true surface.

In the production of lenses the blank 2 is placed upon the mold surface 5 of the mold 4 so that a certain portion or portions of the blank, as for instance, the edges in Fig. 2 are supported on the mold surface. The blank 2 is then subjected, as will be later described, to a temperature sufficiently high so that the glass will be softened and rendered pliable without losing shape, and will by subsidence sink downward so that it will conform exactly to the shape, curvature, or contour of the mold face, as shown in Fig. 3, the polished surface 3 of the blank lying against and conforming absolutely to the smooth upper face of the mold.

In the application of heat to the lens blanks that side or face of the glass blank which comes in contact with the mold surface is not subjected to the highest temperature, but the flame or other form of heat is directed against the outer face of the blank so that that face of the glass which will come in contact with the mold surface is protected from the direct flame, as is also the mold and the surface of the mold. The side or surface of the blank which receives the most intense heat and which is farthest away from the surface of the mold is usually blistered by the excessive heat, but this does not matter as this reverse side of the lens must be afterward ground and polished in any case in order to produce the curvature desired on that side of the lens. Thus, for instance, it is possible to take a mold and place thereon the flat glass blank. The heat may then be applied to the blank by any one of a number of ways, as for instance by means of a hollow blow-pipe, as shown in Fig. 11. The gas flame is directed against the blank 2 and passed backward and forward so that the flame will lick the glass in each passage. A circular motion of the blow-pipe is used at first so as to warm the piece of glass evenly to prevent fracture from uneven expansion. After the blank has been warmed in this manner, which usually requires from fifteen to twenty seconds, the flame is permitted to play on the blank for a slightly longer period so that the temperature is gradually increased to a point where the blank will bear the higher temperature. At this stage a greater amount of air is forced into the burner, producing a hotter flame, under the action of which the glass blank 2 assumes a red heat. Then more air is allowed to flow into the burner and shortly thereafter the blank of glass subsides, stretches into, and takes on absolutely the form and curvature of the mold. By this process the very intense heat does not reach the mold surface or the surface of the glass which comes in contact with the mold surface, both of which are sufficiently protected by their position in relation to the flame. The hottest part of the glass is on the reverse surface of the glass, and this reverse side of the blank only is affected by the intense heat. By this process it is possible to form a lens by subsidence, without, however, pitting the surface coming in contact with the surface of the mold.

It is to be understood that after the blank of glass is brought to a dull red heat, it can be safely subjected to the continuous flame from the burner without any further intermissions and very shortly thereafter the intense heat can be safely increased until the blank is brought to that sufficiently high degree of temperature at which it becomes soft and pliable and of its own weight settles and subsides into and takes on or assumes the shape or conformation or curvature of the mold at which stage the contact of the flame or the application of the heat to the blank of glass is discontinued. The blank may then be immediately removed from the mold at this point but in this case, it will be brittle and easily fractured, or the glass may be allowed to remain in the mold for a period, during which period it gradually and evenly cools, thereby rendering the piece of glass tough and serviceable or the blank may be immediately removed from the mold and placed in an annealing furnace, where it is subjected to decreasing degrees of temperature and finally removed from the annealing furnace in a very much cooled state, thereby rendering it tough and serviceable.

While I have above referred to the use of a gas flame projected against the blank by a blast of air, it will be obvious that the glass may be brought to a dull red heat in any one of a number of ways. A hot plate may be employed or a furnace may be used, but when the piece of glass reaches the red heat and from that stage on, the more intense heat necessary to cause the blank of glass to become soft and pliable and cause it to settle or subside into the mold must be applied only to the side or face of the glass which does not come in contact with the mold surface. This more intense heat may be applied by the employment of any one of a number of different burners or heating apparatus, or a furnace so constructed and arranged as to direct the heat entirely against the outer face of the glass. The side or face of the glass which does not come in contact with the mold surface is in most cases blistered or pitted from a direct action of the more intense heat, but the side or face of the blank which does come in contact with the mold surface is sufficiently protected by its position, from the action of the more intense heat, and being so protected, it is neither blistered or pitted. The more intense heat used to cause subsidence therefore, does not come in contact with the side face of the blank which is opposed to or confronts a mold surface and the more intense heat does not come in contact with that portion of the mold surface which is covered and thereby protected by the blank.

While I have above referred to means for directing the flame downward upon the blank by means of a blow-pipe or blow-torch, it is to be understood that a furnace might be used for making lenses under my method, provided the mold surface were shielded from the heat and provided the outer surface of the glass blank, that is, the surface farthest away from the mold, is caused to receive a more intense heat than the surface of the glass directed toward the mold.

There is produced by the steps above described a partly finished lens blank, having in this instance, the convex surface of the blank absolutely optically true and having an entirely finished and polished convex face. The outer concave face of the lens blank is now to be ground and polished in the usual manner to any desired curve. When this has been done the lens is completely finished.

In Fig. 5 I have shown a cross sectional view of a mold 6 designed to form a lens having two spherical curves of different dioptrics, such as would be suitable to the production of a bi-focal lens, the glass blank 7 being, in this instance, of a sufficient size to produce by cutting or otherwise two or more lenses, each lens containing a portion of the two curvatures. In Figs. 6, 7 and 8 I show the manner in which a glass blank 8 may be molded according to my process into the form of a toric lens, these views showing the glass blank after the completion of the molding process. It is to be understood that in the cases illustrated in Figs. 5, 6, 7 and 8, the polished surface of the glass blank is initially disposed to confront the mold surface of the mold, and that this mold surface is, as before stated, very smooth and absolutely true to the conformation of the lens surface desired so that the lens blank when removed from the mold will have one surface thereof retaining its original polish and this lens surface shall be absolutely true.

Fig. 9 illustrates the manner in which a lens may be produced having a concave polished and finished surface. In this case the mold 10 has a convex mold face designated 11. The blank 12 is placed upon this convex surface and then by the application of heat the blank is softened and rendered pliable so that the margin of the blank will subside upon the convex surface and the inner face of the blank, while retaining its original polish, will conform exactly to the convex mold surface, the other face being ground and polished to complete the lens.

It will be seen from the drawings and understood from the previous description that the face of the lens blank opposite to that which has taken on or acquired the curvature or conformation of the mold is either depressed, or as in Fig. 9, rendered convex, or otherwise changed in shape so that in case the lens is intended for the production of eyeglasses or spectacles the shape which it has acquired by subsidence in the mold will in many cases facilitate its completion, as there will be less material to be ground away or otherwise removed than if the opposite sides were flat or plano, for the reason that the opposite side or face of the glass from that contacting with the mold face has been caused to take on or assume a certain degree of curvature or a certain shape more like in conformation to the finished shape of the eye glass lens than the flat or plano surface would be.

In a number of patents of which I have cognizance it has been proposed to give what may be termed a rough or approximate conformation to the lens by supporting the lens blank in a mold and then raising the temperature of the blank so as to soften the glass and permit the glass by subsidence to take the conformation of the mold, but in none of the proposed processes known to me is it provided that the side or face of the lens blank which comes in contact with the mold surface shall be finished. Thus in Patent #1,048,227, granted to R. Straubel for process for producing lenses, it is the face of the lens blank away from the mold on which the original lens surface is retained or produced, and in this patent only one kind of lens can be produced, that is, a lens having an elliptical lenticular or parabolic shape, the patent being for the sole purpose of producing or forming the concave side of a parabolic lens, it being distinctly set forth in this patent that the convex side of the lens, after the blank has subsided in the mold, is not optically true, and that this convex side has afterward to be ground and polished to the desired curvature. In this patent the lens blank is initially ground on both sides and then polished on the side which is to be uppermost in the mold so that this polished surface shall not come in contact with the mold surface, then the blank is submitted to heat to cause it to subside into the mold, after which the blank is again ground and then polished on the side or face which has been in contact with the mold surface.

Patent #4,786, granted to Paine, Oct. 3, 1846, is of the same character and is for the sole purpose of producing or forming the convex side of a parabolic lens, which convex parabola is on the face of the lens blank which does not come in contact with the mold surface. By my method the original polish of the mold confronting face of the lens blank is preserved throughout the operation, and by my process I produce a concave or a convex parabolic lens, or a concave or convex lens of any other curvature or surface or combination of any description on the side or face of the glass which does come in contact with the mold surface. By my process lenses may be produced by a simple, quick, inexpensive and positive method, and the lenses so produced are perfect and complete on one face of the lens and require no further grinding or polishing on that face.

It has heretofore been proposed to form sheets of bent glass by the use of a concave mold of cylindrical curvature, but such proposed method for forming sheets of glass is not adaptable for the production of lenses, as the surface produced would not be an optical or finished surface. In my process the glass stretches into conformity with the mold. Thus, for instance, a flat piece of glass may measure one inch from edge to edge before molding, while the curved lens produced from that piece of glass may measure one and one-quarter inches from edge to edge, for the reason that the edges of the piece of glass retain their first point of contact with the mold surface while the whole body of the piece of glass stretches into the curvature or conformation of the mold, thereby producing a polish on the glass somewhat superior to the original polish.

Thus I find in practice that a convex lens molded from a plano-parallel blank is thinner at the center than at the edge when taken from the mold, for the reason that the piece of glass stretches into the mold, the edges of the blank remaining unchanged in thickness and retaining their first point of contact with the mold surface.

It is to be understood that the face of the mold used by me is to conform to the exact curvature required with all the care and particularity used in the grinding and polishing of lenses, and these molds may either be of metal or of very finely pulverized granular material. In the latter case the die by means of which the granular substance is molded is very highly polished the same as the metallic molds are ground and polished. The molds formed from granular material, however, while absolutely true upon the mold surface are produced from a die which is itself highly polished. A mold of the character described may be produced by turning in a lathe until a near curvature is produced and then producing the required absolutely true curvature by finishing in the lathe by means of a properly curved tool the cutting edge of which is absolutely true of curve and shaped so that the finished curvature may be given the metallic mold or die in one operation. A mold may be ground and polished in the same manner in which a curved piece of glass may be ground and polished and in the same manner in which a lens is ground and polished to a curve. A mold may be also produced from a die or mold by substituting any other finely powdered substance or compound, the mold so produced being smooth and perfect, but not being either ground or polished. The die used may be cut true by a specially made finishing cutter, or it may be ground and polished in the same manner in which a lens is ground and polished.

The metallic molds above referred to are produced by grinding and polishing in the same manner in which a lens is ground and polished. For the production of a metallic mold of a single curve an ordinary vertical lens-grinder's lathe may be used. It is not necessary for a metallic mold to be highly polished, but it must be smooth and of the proper curvature. In producing a metallic mold of more than one curvature, such as would be suited for the production of a bi-focal or tri-focal lens, one method which I employ consists in grinding the two curvatures on the face of a single piece of metal by means of two ordinary lens grinding cutting dies, each suited to one of the two curvatures and having either a single or each an individual pivotal center. By the use of a metallic mold so produced I can produce a bi-focal lens mold, perfect as to surface, but not absolutely perfect as to extreme sharpness of dividing line between the two curvatures. Another method of producing a metallic mold for the production of a bi-focal lens consists in using a mold formed of two pieces of metal, one fitting within the other, each piece having its individual mold face curvature and so made as to fit or be joined together in perfect adjustment and thereby produce an absolutely sharp dividing line.

The material for forming molds of finely powdered substance or compound which I have found very well suited for the purpose is caseite or fire-clay. The powdered material is dampened and placed within a retaining wall. A die having the proper facial curvature is then disposed above the material in the wall and pressure is exerted sufficient to produce an impression of the die, in reverse, on the face of the moistened disk of fire-clay. A fire-clay mold so produced is gradually dried and then baked in the usual manner in which crucibles and dishes are treated. If caseite is employed, the procedure is exactly the same except that no baking is employed. The caseite mold, however, must be dried slowly.

I am aware of the fact that the patent to De Voursney, 280,143 patented June 26th, 1883, describes a method of bending glass, wherein the glass is disposed in the mold, submitted to the action of heat and subsides into the mold. In this patent the surface of the glass is prevented from pitting by the provision of an air cushion between the mold and the glass. In actual practice, however, this method as described in this patent is inapplicable to the manufacture of lenses for the reason that the air contained within the mold beneath the blank, will expand as the glass lowers into the mold and force the center of the glass upward to a greater or less degree, thus preventing the mold shown in the patent being used for the production of lenses. Furthermore, I have found by experiment that the surface of the glass which comes in contact with the mold will not become "pitted" as stated in this patent provided the flame or heat is projected only against that face of the glass blank which is away from the face of the mold.

In most cases an optically true mold produces an optically true lens but in some rare instances it does not. In all cases, however, the glass and the mold are in absolute contact when the temperature is at its highest point. The mold and the glass both expand under the action of the heat and both contract upon being cooled. The expansion of the mold and the glass is conjunctive and also uniform when the mold is not too thick or heavy or composed of a material whose expansive and contractive properties are not in synchronism with those possessed by the glass under the same influence of altered temperatures. Therefore, in these rare instances to which I have referred, it will be necessary for the mold face upon which the glass subsides to be infinitesimally out of true with respect to the degree of lens curvature desired, in order that an absolutely true and perfect lens of the desired conformation may be produced in the use of the mold. This will be manifest from the fact that on account of the minute difference in relative expansion of the metal and the material of the mold at the highest temperature thereof, the mold will be expanded to a point beyond that at which its mold face presents the exact curvature desired in the lens. At this point the application of the heat is discontinued which results in the lens becoming instantaneously set and rigid so that the process of contraction immediately begins and takes place simultaneously in both the mold and the lens. The contraction in the glass lens is slight, but that of the mold is somewhat greater. Usually, it will be found that this will occur only in the production of the larger lenses or in the employment of materials in the mold construction whose capabilities of expansion and contraction are greater or less than the corresponding properties of the glass.

The term polished surface as herein used is intended to include not only a surface artificially polished as by rubbing but surfaces having that high degree of smoothness or finish, however produced, which are ordinarily described by the term polished.

The phrase "in or on the mold" as used in the claims is designed to include any positioning of the blank with respect to the mold which will permit the blank to subside into or against the mold face. Thus the blank might be spaced slightly above the mold before heat is applied thereto and be within the scope and meaning of the claims.

Having described my invention, what I claim is:—

1. A process of producing lenses, consisting in preparing a mold with an optically true and smooth mold surface, disposing a lens blank having a polished and finished face upon the mold with its polished face confronting the mold surface, and rendering said blank subsident by heat applied to that face of the blank farthest away from the face of the mold to thereby bring the finished and polished surface of the blank in contact with and in exact conformity to the mold surface, whereby to produce a lens having the mold confronting surface thereof completely finished and optically correct.

2. A process of producing lenses, consisting of preparing a mold with an optically true and smooth mold surface, disposing a lens blank having a polished and finished face upon the mold with its polished face confronting the mold surface, rendering said blank subsident by heat applied to that face of the blank farthest away from the face of the mold to thereby bring the finished and polished surface of the blank in contact with and exact conformity to the mold surface whereby to produce a lens having the mold contacting surface thereof completely finished and optically correct, and then causing the opposite surface of the blank to conform to a prescribed optical conformation.

3. A process of producing lenses, consisting in preparing a mold with an optically true and smooth mold surface, disposing a lens blank having a polished and finished face upon the mold with its polished face confronting the mold surface, rendering said blank subsident by heat applied to that face of the blank farthest away from the face of the mold to thereby bring the finished and polished surface of the blank in contact with and exact conformity to the mold surface thereby to produce a lens having the mold contacting surface thereof completely finished and optically correct, and then, by grinding and polishing, causing the opposite surface to conform to a prescribed optical conformation.

4. A process of producing lenses consisting in preparing a mold with an optically true and smooth mold surface, placing a plano-parallel lens blank thereon having a finished and polished face, with the polished face confronting the surface, rendering said blank subsident by heat applied to that face of the blank farthest away from the face of the mold to thereby bring the polished and finished surface of the blank in contact with and exact conformity to the mold surface, whereby to produce a lens having one surface completely finished and optically correct and the other surface having approximately the final conformation desired and then, by grinding and polishing, causing this more or less approximately true surface to conform exactly to a prescribed optical conformation.

5. A process of producing lenses, consisting in manufacturing a lens blank, one surface of which is completely finished and polished, providing a mold with an optically true and smooth surface, placing the lens blank upon the mold with the polished and finished face confronting the mold surface, rendering said blank subsident by heat, applied to that face of the blank farthest away from the face of the mold to thereby bring said polished and finished surface into exact contact with and conformity to the mold surface, whereby said last named surface of the blank shall retain its original polish but have the conformation of the mold surface, and thereafter grinding and polishing the surface of the blank opposite the mold contacting surface to thereby complete the lens.

6. A process of producing lenses, consisting in providing a lens blank having a polished and finished surface, providing a mold having a finished and smooth mold surface disposing the blank within the mold with its polished surface confronting the mold surface, and bringing the blank through the agency of heat, applied to that face of the blank farthest away from the face of the mold to a temperature whereby the blank is softened and rendered pliable so that it will take on and acquire the shape of the mold in which the blank is disposed, the blank retaining its original polish or surface throughout the process, whereby to produce one face of a lens, said face being polished and being composed of one or more shapes or curves, or combinations of shapes or curves.

7. A process of producing lenses consisting in preparing a mold with an optically true and smooth surface, disposing a lens blank having a polished and finished face upon the mold with its polished face confronting the mold surface, bringing said blank to a red heat and then increasing the heat and applying said increased heat to that face of the blank farthest away from the face of the mold, to thereby cause the lens blank to subside and bring the finished and polished surface of the blank in contact with and in exact conformity to the mold surface, whereby to produce a lens having a mold confronting surface completely finished and optically correct.

8. A process of producing lenses, consisting of preparing a mold with a finished and smooth mold surface, which mold surface is of the proper curvature, contour or conformation necessary for the production of the lens desired, disposing a lens blank having a polished and finished face upon the mold with its polished face confronting the mold surface, rendering said blank subsident by heat applied to the face of the blank farthest away from the face of the mold to thereby bring the finished and polished surface of the blank in contact with and in exact conformity to the mold surface whereby to produce a lens having the mold contacting surface thereof completely finished and optically correct, and then causing the opposite surface of the blank to conform to a prescribed optical conformation.

In testimony whereof I hereunto affix my signature in the presence of two witnesses.

WILLIAM H. EADER.

Witnesses:
 WILLARD E. McCOURT,
 FLOYD M. WOLFE.